(12) United States Patent
Kimura et al.

(10) Patent No.: US 6,480,264 B1
(45) Date of Patent: Nov. 12, 2002

(54) LASER BEAM DETECTING DEVICE

(75) Inventors: Kazuaki Kimura, Tokyo (JP); Yoshiyuki Usami, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/594,613

(22) Filed: Jun. 15, 2000

(30) Foreign Application Priority Data

Jun. 15, 1999 (JP) ............................................ 11-168369

(51) Int. Cl.$^7$ ................................................ G01C 3/00
(52) U.S. Cl. ...................................................... 356/3.04
(58) Field of Search ............................ 356/4.08; 37/234

(56) References Cited

U.S. PATENT DOCUMENTS

| | | | | |
|---|---|---|---|---|
| 4,245,602 A | * | 1/1981 | Omori et al. | 123/406.35 |
| 4,642,618 A | * | 2/1987 | Johnson et al. | 340/683 |
| 4,945,221 A | * | 7/1990 | Nielsen et al. | 250/203.1 |
| 5,404,128 A | * | 4/1995 | Ogino et al. | 180/273 |
| 5,917,593 A | * | 6/1999 | Hirano et al. | 356/247 |
| 5,983,511 A | * | 11/1999 | Osaragi et al. | 33/293 |

FOREIGN PATENT DOCUMENTS

| | | | |
|---|---|---|---|
| EP | 0 262 764 A1 | 4/1988 | ............ E02F/3/43 |
| EP | 0 797 075 A2 | 9/1997 | ........... G01C/15/00 |

OTHER PUBLICATIONS

Patent Abstracts of Japan, vol. 1996, No. 09, Sep. 30, 1996, & JP 08122077, May 17, 1996 (abstract).

* cited by examiner

*Primary Examiner*—Thomas H. Tarcza
*Assistant Examiner*—Deandra M. Hughes
(74) *Attorney, Agent, or Firm*—Foley & Lardner

(57) ABSTRACT

A laser beam detecting device is disclosed for detecting a laser beam which is emitted from a laser beam generator and which forms a reference plane. A power supply for a laser beam sensor used in the laser beam detecting device is turned OFF automatically when a construction machine with the laser beam detecting device attached thereto is not in operation, while upon operation of the construction machine, the resulting vibration is detected by means of a vibration sensor and the power supply for the beam sensor is turned ON. By so doing, there is attained a superior power saving characteristic and it is possible to effect operation over a long time even with use of cells or a battery.

4 Claims, 4 Drawing Sheets

LASER BEAM DETECTING DEVICE

TECHNICAL FIELD OF THE INVENTION

The present invention relates to a laser beam detecting device for detecting a laser beam emitted from a laser beam generator such as a rotating laser which is used in a land formation work or the like.

RELATED ART

A laser beam detecting device is installed in the vicinity of a leveling implement of a construction machine. Therefore, wiring which uses cords is an obstacle to the installation of the laser beam detecting device. Moreover, it is very dangerous to be caught by the leveling implement and therefore, for avoiding such a danger, it is necessary to exercise a great care in installing the laser beam detecting device. Thus, the work for installing the laser beam detecting device has so far been very troublesome.

For dispensing with such cords it has been proposed to drive the laser beam detecting device with a battery.

If the laser used is kept in operation, the battery will soon run down.

In the conventional laser beam detecting device, for avoiding such an inconvenience, the operation of a power supply for the entire device is switched over between ON and OFF, depending on whether a laser beam is incident or not.

In this case, if a predetermined time elapses in the absence of a laser beam, the operation mode of the device becomes "sleep mode" and the device stands by. When a beam sensor used in the laser beam detecting device detects a laser beam in the sleep state, the sleep mode is canceled and the laser beam detecting device assumes an operating state.

The conventional laser beam detecting device which detects the incidence of laser beam is required to be always in a state capable of detecting a laser beam. That is, the beam sensor must be kept ON.

However, since the beam sensor has a function of detecting a laser beam incidence position, it is provided with an analog circuit having many channels, resulting in power consumption as much as about five-sixths of that of the device.

Thus, even in the sleep mode, a power saving effect cannot be expected so much; that is, the consumption of the battery used has not been reduced so much.

SUMMARY OF THE INVENTION

It is an object of the present invention to realize a high power saving characteristic.

This object can be achieved by a laser beam detecting device described herein.

The laser beam detecting device according to the present invention detects a laser beam which is emitted from a laser beam generator and which forms a reference plane. A beam sensor used in the laser beam detecting device for detecting a laser beam is connected to a power supply. When a construction machine with the laser beam detecting device attached thereto is not in operation, the power supply is turned OFF automatically. Upon re-operation of the construction machine, vibration of the construction machine is detected by a vibration sensor, thereby tuning ON the power supply for the beam sensor.

Preferably, the vibration sensor is constituted by a chip capacitor.

In a preferred mode of the present invention, the power supply for the beam sensor is controlled by a microcomputer and the state of operation of the construction machine is detected by the vibration sensor.

With this configuration, not only the cancellation of a sleep mode can be controlled positively by the operation of the construction machine to which the laser beam detecting device is attached, and not by incidence of a laser beam, but also in the sleep mode it is possible to stop the supply of electric power to the beam sensor, that is, the supply of electric power to only the vibration sensor suffices, thus permitting a remarkable reduction of power consumption.

A laser beam detecting device in a preferred mode of the present invention is fixed to a predetermined position of, for example, an arm of a construction machine such as an excavator through a magnet or a clamp. The predetermined position as referred to herein indicates a position which permits an offset to be clarified between a leveling implement (especially a tip end thereof) such as a bucket which forms a working surface and the predetermined position.

In a working site, a reference plane is formed with a laser beam emitted from a laser beam generator such as a rotating laser.

The laser beam detecting device is mounted above the leveling implement of the construction machine so that a reference position is established at a predetermined height with respect to a portion of the leveling implement which portion forms a working surface.

In the laser beam detecting device, a laser beam is detected by the beam sensor, and in accordance with a deviation (in the vertical direction) between an incidence position of the laser beam and the reference position of the device, the direction in which the leveling implement is to be moved is instructed to an operator of the construction machine on a display (display portion).

In a laser beam detecting device according to a more preferred embodiment of the present invention, the beam sensor is mounted above the leveling implement, a laser beam as a reference is detected by the beam sensor, and information based on the beam detection is displayed on a display.

A plurality of reference positions are established in a detection range of a beam receiving portion of the beam sensor and one of the reference positions is made a standard position, while the other reference positions are made offset positions. First and second offset positions are established respectively above and below the standard position. There is provided a display (display portion) indicating in which of standard and offset positions the laser beam detection is being conducted.

In the beam sensor used in the laser beam detecting device, an incidence position of a laser beam with respect to a reference position (height indication) is detected, and on the basis of the detected beam incidence position, the direction in which the leveling implement is to be moved, as well as the distance at which the leveling implement is to be moved, are indicated to the operator.

The laser beam detecting device is attached, at the back of its body, to a predetermined position (e.g., arm) of the construction machine removably with screws or the like.

Alternatively, the laser beam detecting device may be fixed magnetically to the leveling implement of the construction machine. In this case, a strong magnetic force can be obtained by holding plural magnets in between plural net plates. In this case there is attained a high durability because the net plates are in contact with the leveling implement. Besides, since the net plates are each adapted to move slightly, they can fix the magnets securely and prevent them from coming off even if the magnet surfaces are somewhat uneven or even under an abrupt shock.

The laser beam detecting device may also be fixed to a pole or the like which is fixed to the leveling implement. In this case, a clamp is often used for the fixing.

EMBODIMENT

An embodiment of the present invention will be described hereunder with reference to the accompanying drawings.

Figure 1:
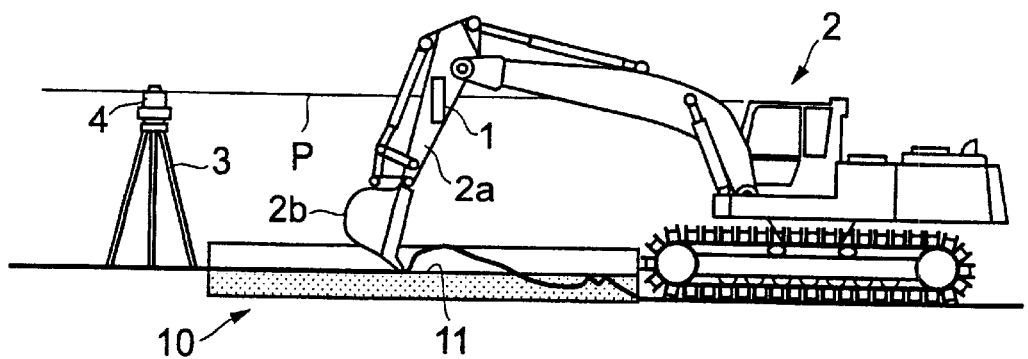
FIG. 1 is an explanatory diagram showing a state in which a shovel car having a laser beam detecting device for a construction machine according to the present invention is performing a standard work.

FIG. 1 is a plan view showing a state in which a civil engineering work is being carried out by a shovel car 2 equipped with a laser beam detecting device 1 for a construction machine according to the present invention.

In FIG. 1, the reference numeral 10 denotes a detection range of a leveled land (formed land surface).

In the leveled state shown in FIG. 1, a reference position 11 of the leveled land is a standard position.

In the leveled state of FIG. 1, a rotating laser 4 is installed at a predetermined position of the leveled land or a land adjacent thereto through a tripod 3. A laser beam P emitted from the rotating laser 4 forms a reference plane.

The laser beam detecting device 1, which is for indicating an appropriate height to an operator on the construction machine 2 in cooperation with the laser beam P, is attached to an arm portion 2a of the construction machine.

Figure 2:
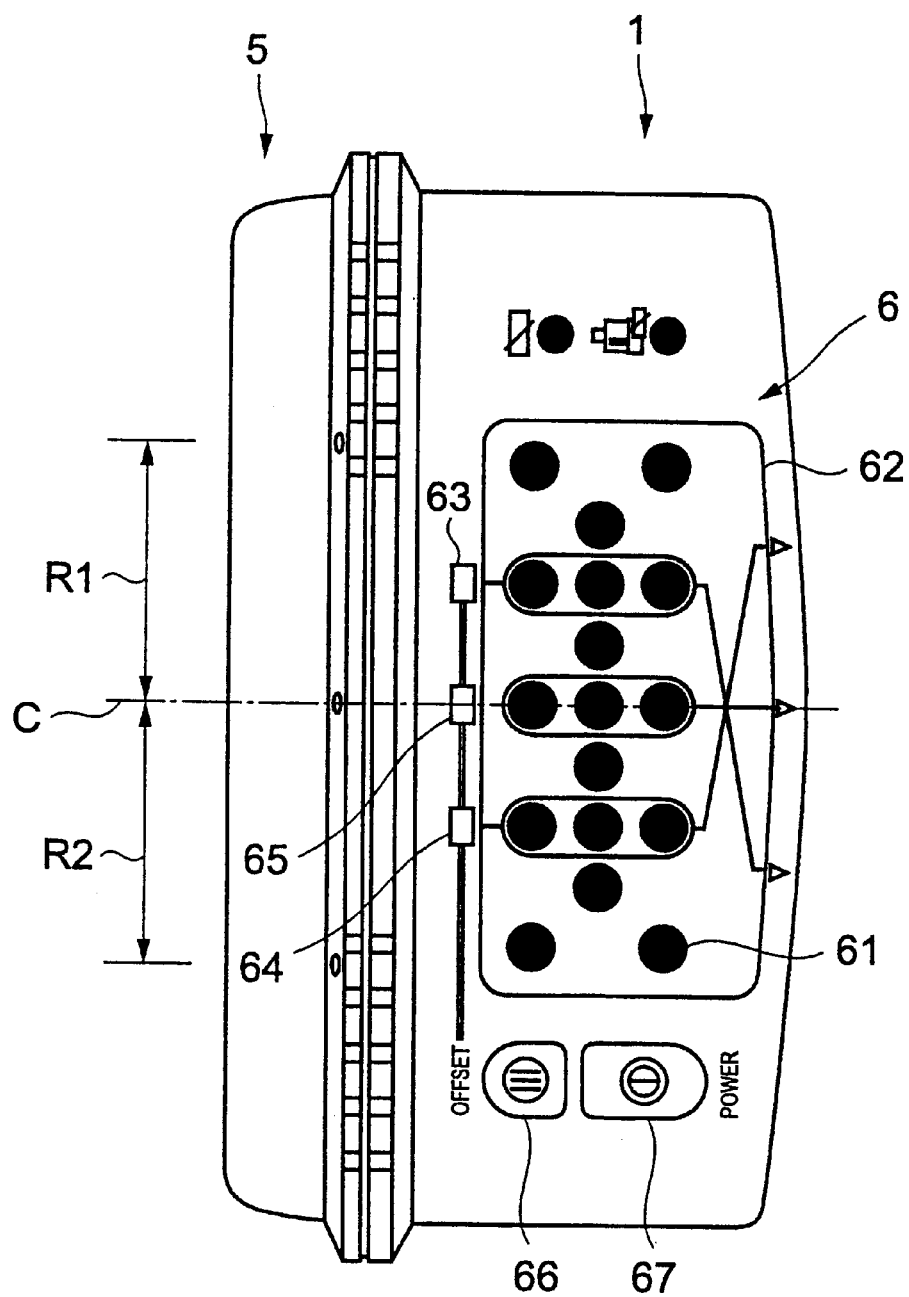
FIG. 2 is a side view of the laser beam detecting device of FIG. 1.

As shown in FIG. 2, the laser beam detecting device 1 has a beam sensor 5 for detecting the laser beam P and a display 6 for indicating an offset from the appropriate height to the operator on the construction machine 2 on the basis of the result of the detection.

The beam sensor 5 is disposed at a front position of the laser beam detecting device 1. In a detection range of the beam sensor 5 are disposed an upper range R1 and a lower range R2 with respect to a center C. The ranges R1 and R2 are each about 10 cm in size. A laser beam is transmitted from left to right in FIG. 2 and can enter the detection range of the beam sensor 5.

Within a rectangular frame 62 on the display 6 are arranged a large number of light emitting elements (e.g., LEDs) 61 in accordance with a predetermined pattern. Nine rows are set in the vertical direction. Successively from above, two, one, three, one, three, one, three, one, and two light emitting elements 61 are arranged in the nine rows, respectively. Thus, there are three rows each including three light emitting elements, all of which represent reference positions and of which the central row represents a standard position, while the upper and lower rows represent first and second offset positions, respectively. Marks 63, 64, and 65, which are light emitting elements, are arranged correspondingly to the rows indicative of those reference positions.

The reference numeral 66 denotes a button for selecting any one of the mark 65 as the standard position and the marks 63 and 64 as the first and second offset positions. The positions of the marks 63, 64, and 65, which are set (i.e., go ON) at every depression of the button 66 by the operator, change rotationwise. The numeral 67 denotes a power switch for ON-OFF switching.

The operation of the display 6 will now be described with reference to FIG. 3. In the same figure, white circles and squares indicate an ON (or ON-OFF) state of the light emitting elements 61 and 63 to 65, while black circles and squares indicate an OFF state of the light emitting elements 61 and 63 to 65.

Figure 3:
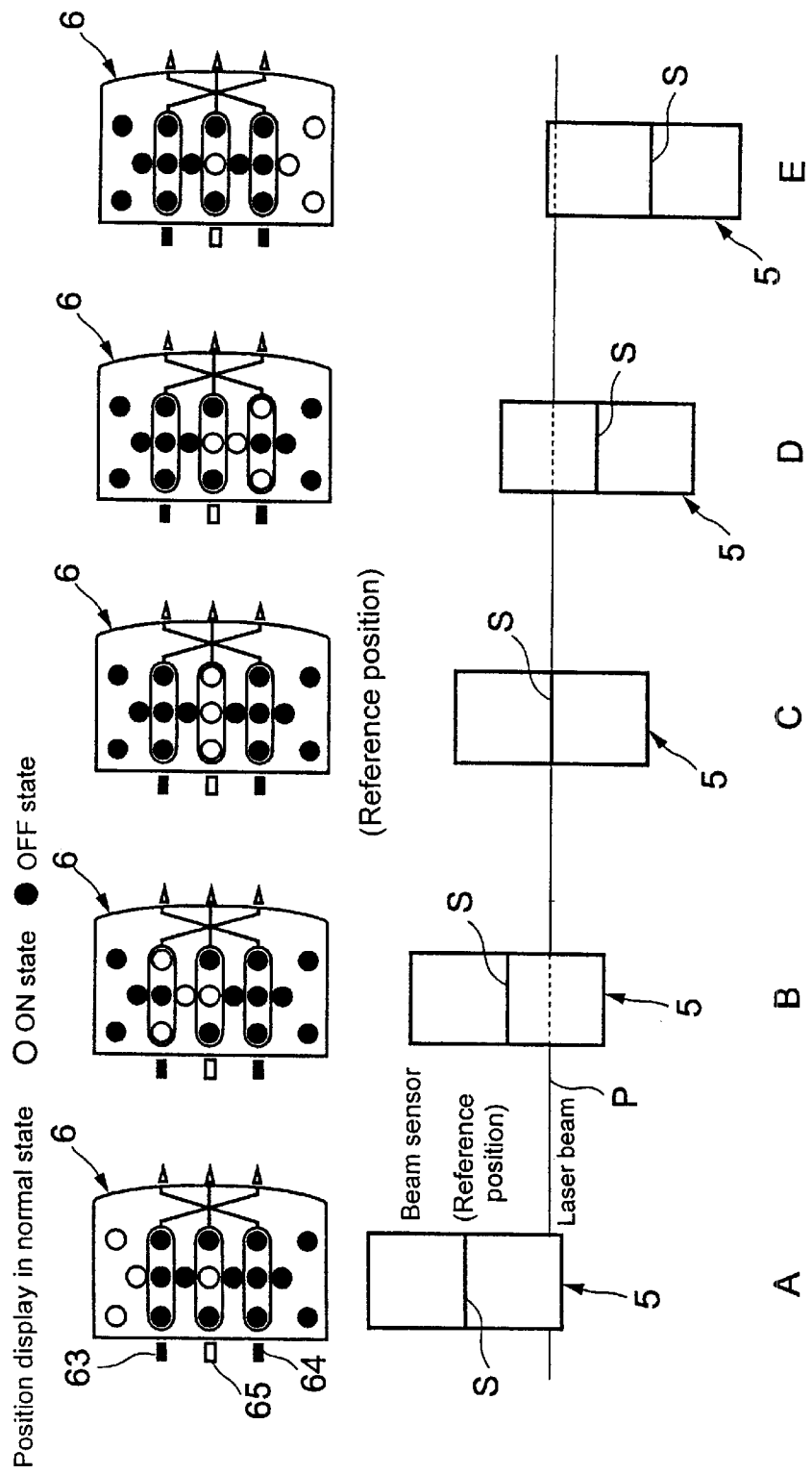
FIG. 3 is a diagram showing an example of position display in a normal state with respect to a beam sensor and a display.

FIG. 3 shows an example of position display in a normal state, in which the mark 65 at the standard position is ON.

In A and B of FIG. 3, the laser beam P lies below the reference position (standard position) S of the beam sensor 5.

In C of FIG. 3, the laser beam P is in coincidence with the reference position (standard position) S.

In D and E of FIG. 3, the laser beam P lies above the reference position (standard position) S.

As noted earlier, when the reference position S is offset from the laser beam P, the four light emitting elements 61 emit light in two modes (three light emitting elements which constitute a triangular shape and one light emitting element present at the established reference position), urging the operator to move the arm. At this time, the light emitting element present at the reference position serves as a reference indicating the width and direction of offset with respect to the three light emitting elements which constitute a triangular shape. When the offset is small, the movement of the arm 2 is set small, while when the movement of the offset is large, the movement of the arm 2 is set large.

A plurality of light emitting elements located at the reference position may be turned ON so as to represent a reference line.

When the reference position S and the position of the laser beam P coincide with each other, the light emitting elements 61 which have emitted light in a triangular shape go OFF and a transverse row of three light emitting elements 61 newly located at the reference position emit light, indicating completion of the movement.

Preferably, the light emitting elements 61 in a triangular form and the light emitting elements 61 located in the apex direction of the triangle are turned ON in an alternate manner, thereby making it easier to visually check the direction of offset.

Figure 4:
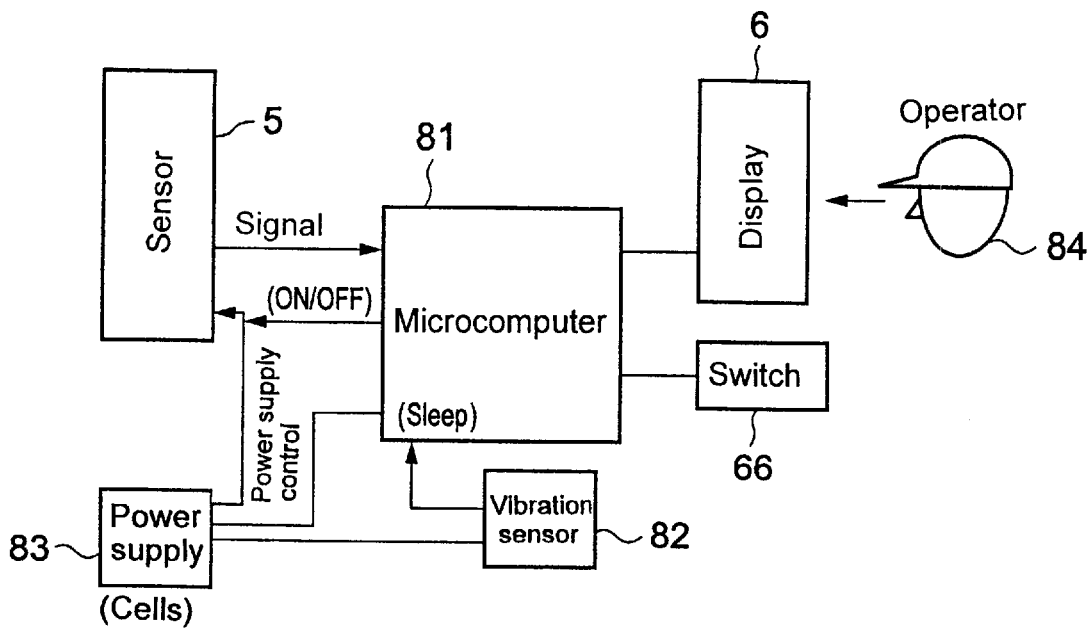
FIG. 4 is a block diagram showing a control system for the beam sensor.

FIG. 4 shows a system for controlling the beam sensor 5 and the display 6.

The beam sensor 5 for detecting the laser beam P has an analog circuit (not shown). A power supply 83 for the beam sensor is controlled by a microcomputer 81 which is incorporated in the body of the laser beam detecting device.

If there is no input of the laser beam P for a certain period of time (e.g., 5 minutes), the microcomputer 81 judges that no construction work is being conducted, then sets the operation mode to a sleep mode and turns OFF the power supply 83 for the beam sensor 5.

On the other hand, upon turning to the sleep state, a sleep reset signal, which is inputted to the microcomputer 81 from a vibration sensor 82, becomes effective. This signal is for canceling the sleep state and is applied to the microcomputer 81 when vibration is detected by the vibration sensor 82. The vibration sensor 82 is power-supplied by the power supply 83, which is kept ON.

An example of power consumption will now be described. The power consumption of the entire device is 300 mW in operation and is 49 mW in the sleep state. The analog circuit in the beam sensor 5 consumes electric power about five-sixths of the electric power consumed by the entire detecting device and thus the power saving effect in the sleep mode is high.

The reason for such a large power consumption of the beam sensor 5 is that the beam sensor requires a large number of circuit channels for detecting a laser beam incidence position and that therefore a large electric power is consumed inevitably.

As the power supply 83 there are used four UM-3 charging cells of NIMH type. Of course, the ordinary type of dry cells or a battery may also be used.

Figure 5:
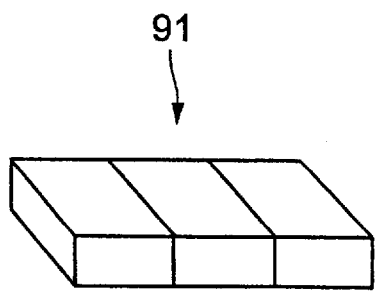
FIG. 5 is a perspective view showing an example of a vibration sensor.

FIG. 5 shows an example of the vibration sensor 82.

The vibration sensor 82 is of a configuration similar to the configuration of a chip capacitor and possesses a characteristic such that a weak current is generated upon imposition of vibration on plural capacitors 91.

Since an electric current generated actually is fairly weak, it is amplified by means of an amplifier (not shown) and thereafter a sleep reset signal is sent to a sleep reset port of the microcomputer 81.

The power consumption of the vibration sensor 82 is fairly weak and is 1 mW or so, even including the amplifier circuit.

The vibration sensor 82 used in this embodiment is "PKGS-45LB-TC" (a product of Murata Manufacturing Company Limited).

In FIG. 4, the numeral 84 denotes an operator and numeral 66 denotes a switch for the microcomputer 81.

The use of such a vibration sensor 82 permits reduction of the power consumption in the entire laser beam detecting device. Particularly, where a battery or the like is used as a drive source, there no longer is any fear that the work may be interrupted by exhaustion of the battery, thus enhancing the working efficiency.

Besides, by keeping the power consumption low, it is possible to reduce the battery capacity and lighten the device weight.

That the device becomes light is advantageous in that the device becomes less likely to come off under a sudden shock and becomes easier to carry for installation in a construction machine.

The use of the vibration sensor permits the device to be controlled accurately in conformity with the operating condition of the construction machine in which it is installed.

According to the present invention there can be attained a superior power saving characteristic. Further, even with use cells or a battery, it is possible to effect operation over a long time.

What is claimed is:

1. A laser beam detecting device for detecting a laser beam which is emitted from a laser beam generator and forms a reference plane, comprising:

a beam sensor, mountable on a construction machine, for detecting the laser beam;

a power supply for operating the beam sensor; and a vibration sensor to detect an operating state of the construction machine, wherein the beam sensor is turned OFF automatically when the construction machine equipped with the laser beam detecting device is not in operation and the beam sensor is turned ON upon operation of the construction machine.

2. A laser beam detecting device according to claim 1, wherein the vibration sensor is constituted by a chip capacitor.

3. A laser beam detecting device for detecting a laser beam which is emitted from a laser beam generator and forms a reference plane, comprising:

a beam sensor, mountable on a construction machine, for detecting the laser beam;

a vibration sensor for detecting an operating state of the construction machine; and a controller to signal an automatic turn off of the beam sensor after a period of inactivity of the construction machine; wherein the vibration sensor signals the controller.

4. A laser beam detecting device, for detecting a laser beam which is emitted from a laser beam generator and forms a reference plane, comprising:

a beam sensor, mountable on a construction machine, for detecting the laser beam; and a vibration sensor for detecting an operating state of the construction machine, wherein the beam sensor is activated after signaling via the vibration sensor.

\* \* \* \* \*